(12) United States Patent
Emshey (10) Patent No.: US 7,540,705 B2
(45) Date of Patent: Jun. 2, 2009

(54) HORIZONTAL MULTI-BLADE WIND TURBINE

(76) Inventor: Garry Emshey, 827 Sunset Crescent S.E., Calgary (CA) T2X 3E8

( * ) Notice: Subject to any disclaimer, the term of this patent is extended or adjusted under 35 U.S.C. 154(b) by 530 days.

(21) Appl. No.: 11/307,323

(22) Filed: Feb. 1, 2006

(65) Prior Publication Data
US 2007/0177977 A1    Aug. 2, 2007

(51) Int. Cl.
*F03D 3/04* (2006.01)
(52) U.S. Cl. .................... 415/4.1; 415/127; 416/198 R
(58) Field of Classification Search ................. 415/4.1, 415/4.4, 127; 416/198 R, 228, 197 R; 290/44, 290/55
See application file for complete search history.

(56) References Cited

U.S. PATENT DOCUMENTS

| | | | | |
|---|---|---|---|---|
| 1,973,070 A | * | 9/1934 | Hess et al. | 417/369 |
| RE25,569 E | * | 5/1964 | Coron et al. | 417/353 |
| 3,720,479 A | * | 3/1973 | Latinen | 416/198 R |
| 3,923,416 A | * | 12/1975 | Frey | 415/76 |
| 4,055,673 A | * | 10/1977 | Mueller et al. | 426/231 |
| 4,331,072 A | * | 5/1982 | Muller | 99/606 |
| 4,595,318 A | * | 6/1986 | Viesselmann | 406/97 |
| 4,838,757 A | * | 6/1989 | Benesh | 415/4.4 |
| 5,440,175 A | * | 8/1995 | Mayo et al. | 290/54 |
| 5,472,311 A | * | 12/1995 | Davis | 415/4.1 |
| 6,064,123 A | | 5/2000 | Gislason | |
| 6,069,409 A | | 5/2000 | Fowler et al. | |
| 6,280,144 B1 | * | 8/2001 | Powers | 416/236 A |
| 6,736,593 B2 | * | 5/2004 | Namiki et al. | 415/1 |
| 6,779,966 B2 | | 8/2004 | Smith | |
| 6,814,545 B2 | * | 11/2004 | Hext et al. | 416/210 R |
| 7,270,513 B2 | * | 9/2007 | Regan et al. | 416/85 |
| 7,357,617 B2 | * | 4/2008 | Haga et al. | 415/99 |
| 2002/0015639 A1 | * | 2/2002 | Roberts | 415/4.1 |

FOREIGN PATENT DOCUMENTS

| | | |
|---|---|---|
| GB | 1177665 | 1/1970 |
| GB | 1282796 | 7/1972 |
| WO | WO 2004/061299 | 7/2004 |

\* cited by examiner

*Primary Examiner*—Edward Look
*Assistant Examiner*—Aaron R Eastman
(74) *Attorney, Agent, or Firm*—Sean W. Goodwin; Linda M. Thompson

(57) ABSTRACT

A blade system, has rows of blades extending radially outward along the length and around the circumference of a rotor of a low-profile ground-mounted wind turbine which is particularly suited for use in remote locations. The wind-engaging end of each blade is arc-shaped and is turned about 120 degrees to maximize efficiency. Preferably, two rotors having the unique blade system are connected to a single, centrally located generator, and the entire unit is mounted on a frame which is rotatable on wheels about a central shaft. Further, a circular track is provided in for engaging the wheels for ease of rotation of the unit either under the direction of a PLC or in yaw.

15 Claims, 9 Drawing Sheets

HORIZONTAL MULTI-BLADE WIND TURBINE

FIELD OF THE INVENTION

Embodiments of the invention are directed towards wind turbines for generating energy and more particularly to a horizontal axis wind turbine having a plurality of blades along the horizontal axis and to a blade suitable for said wind turbine.

BACKGROUND OF THE INVENTION

It is well known to use apparatus to generate energy from the wind. Typically, high speed propeller-type turbines have been used due to their high efficiency. Such high-speed turbines are generally very large and generally comprise a nacelle mounted for use atop single towers of significant height and diameter. Such turbines may be unidirectional and erected to take advantage of the usual flow of winds through the location in which they are positioned. Alternatively, the nacelle may be capable of turning in a horizontal plane to adjust the direction of the rotor to face into the oncoming wind.

Many different designs of wind turbines are known. Many wind turbines are oriented vertically, having one or more stacked rotors rotatable about a vertical axis such as described in U.S. Pat. No. 4,359,311 to Benesh. Others are mounted on a horizontal axis and have a plurality of blades typically oriented at one end of the horizontal rotor like a traditional windmill. Multi-vaned rotors or windmills are taught in a number of patents including U.S. Pat. No. 6,064,123 to Gislason, U.S. Pat. No. 6,779,966 to Smith II, U.S. Pat. No. 6,069,409 to Fowler et al., and US Patent Application 2005/0015639.

Of particular interest, U.S. Pat. No. 4,838,757 to Benesh teaches a wind turbine having a Savonius-type rotor mounted along a horizontal rotor. The wind turbine is mounted on a frame having wheels which engage a circular track for rotation in yaw. A wind sensor controls the orientation of the wind turbine relative to the direction of the wind and a deflector plate is mounted at an entrance to the blades to augment and smooth the action of the Savonius-type rotor. One or more airfoils assist in ensuring the alternator is not overloaded in high wind conditions.

There is interest in the field of wind power generation for relatively compact wind turbine units which can be readily transported and mounted at remote locations where other sources of power are scarce and which are relatively simple in design, capable of producing sufficient power for the purpose to which they are directed and which are efficient.

SUMMARY OF THE INVENTION

A low-profile ground-mounted fluid turbine utilizes a unique blade system comprising a plurality of arc-shaped blades mounted in rows along a shaft or rotor.

In a broad aspect the blade system for a fluid turbine comprises: a rotor mounted for rotation about an axis; and a plurality of blades supported in rows along a length and having a blade axis extending radially and spaced about a circumference of the rotor, wherein the blades are formed having a first attachment end for connection to the rotor and a second free end having an arcuate face, a plane of a chord of the arcuate face being rotated about the blade axis at an angle relative to the rotor axis.

Preferably each of the blades is rotated about 120 degrees about the blade axis to maximize fluid engagement and power generation.

In a further broad aspect a blade suitable for use in the blade system as described comprises: a first end for connection to a rotor of a fluid turbine; and a second free end having an arcuate face so as to maximize fluid engagement.

Preferably, the arcuate face of the blade defines a central angle which is about 120 degrees.

An embodiment of the invention utilizing the blade system and blade as described is a fluid turbine comprising: a support framework; a load unit such as a generator and a blade system as described, the rotor mounted to the support frame and connected to the load unit for generation of power therethrough.

Preferably two turbine units are connected to a single centrally located load unit or generator. Such a preferred turbine unit is particularly suitable for remote locations for use in AC power generation for export to grid or for DC power generation for charging battery banks, AC power generation in a closed loop for running electrical equipment in remote locations, pumping water or hydrocarbons in remote locations and compressing air or natural gas in remote locations.

BRIEF DESCRIPTION OF THE DRAWINGS

FIGS. 4a and 4b are schematics illustrating a blade for mounting on the rotor according to FIG. 3, more particularly.

DETAILED DESCRIPTION OF THE PREFERRED EMBODIMENT

Figure 1:
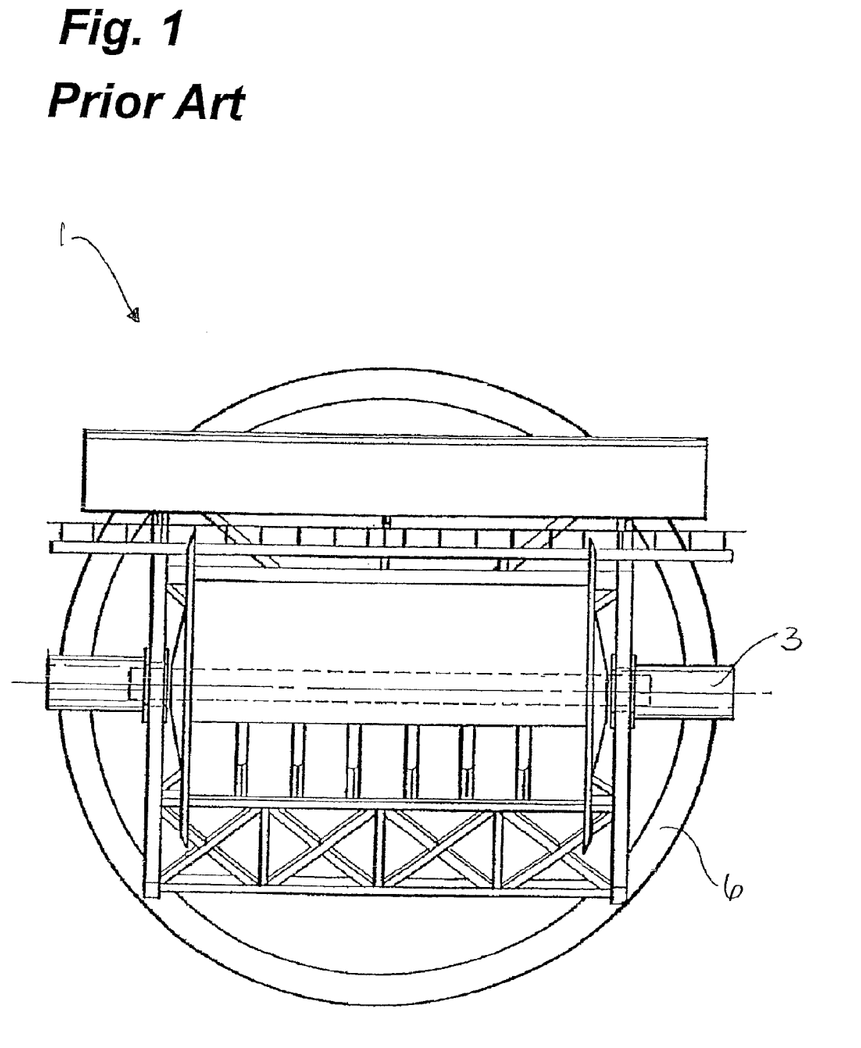
FIG. 1 is a plan view of a prior art wind turbine having a horizontal Savonius-type rotor mounted on a framework and moveable about a circular track for rotating in yaw.
Figure 2:
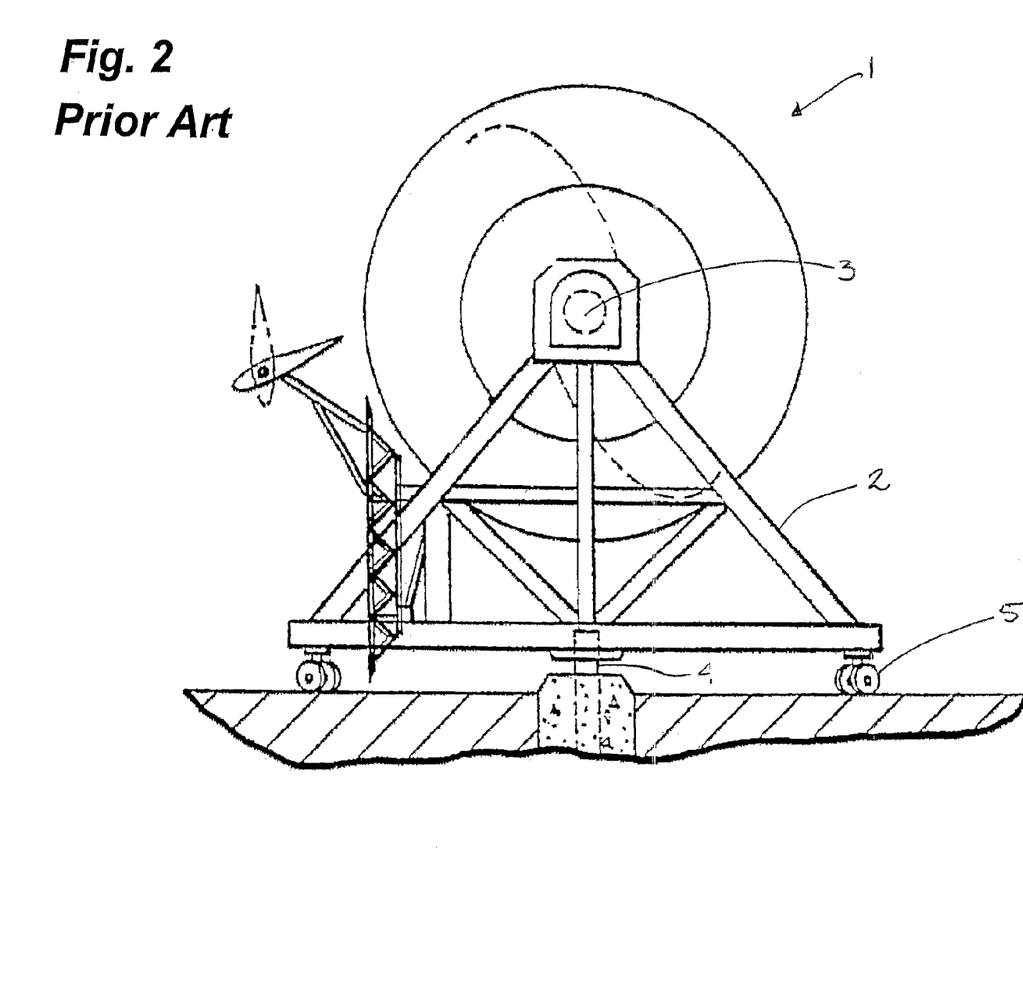
FIG. 2 is an end view of the prior art wind turbine according to FIG. 1 illustrating a frame for mounting the horizontal rotor and having a deflector and one or more airfoils mounted thereon.

As shown in FIGS. 1 and 2, a prior art wind turbine 1 such as described in U.S. Pat. No. 4,838,757 to Benesh the entirety of which is incorporated herein by reference. A support structure 2 for a horizontal rotor 3 is provided which pivots about a central vertical shaft 4. The horizontal rotor 3 is supported by the support structure 2. The support structure 2 is further supported on wheels 5, which travel in a circular track 6 to permit the wind generator 1 to rotate in yaw about the vertical central shaft 4.

Figure 3A:
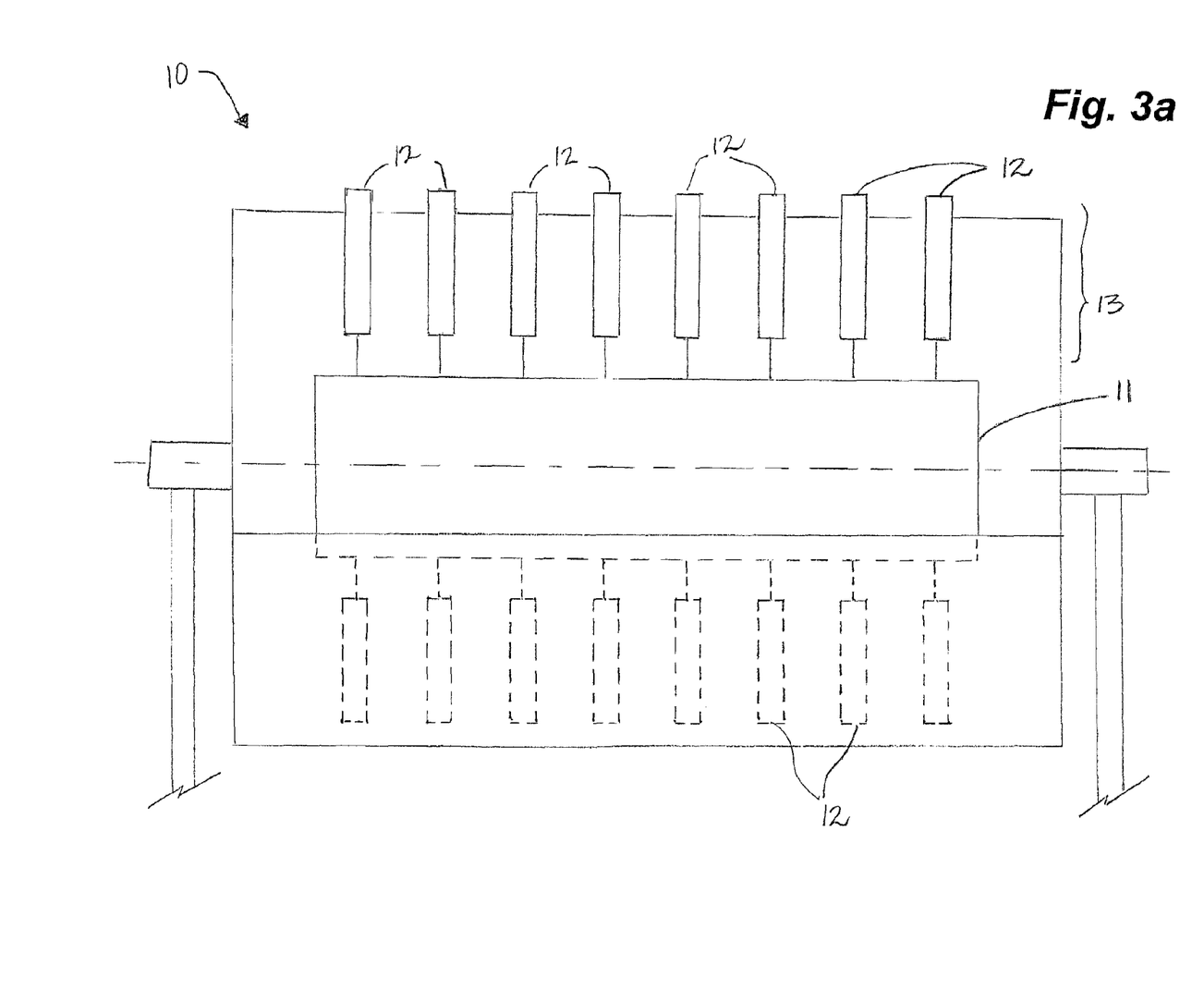
FIG. 3a is a schematic front view illustrating a rotor shaft and a plurality of blades organized in row thereabouts according to an embodiment of the invention for mounting on a support, the rows of blades on the front of the rotor shaft having been removed for clarity.
Figure 3B:
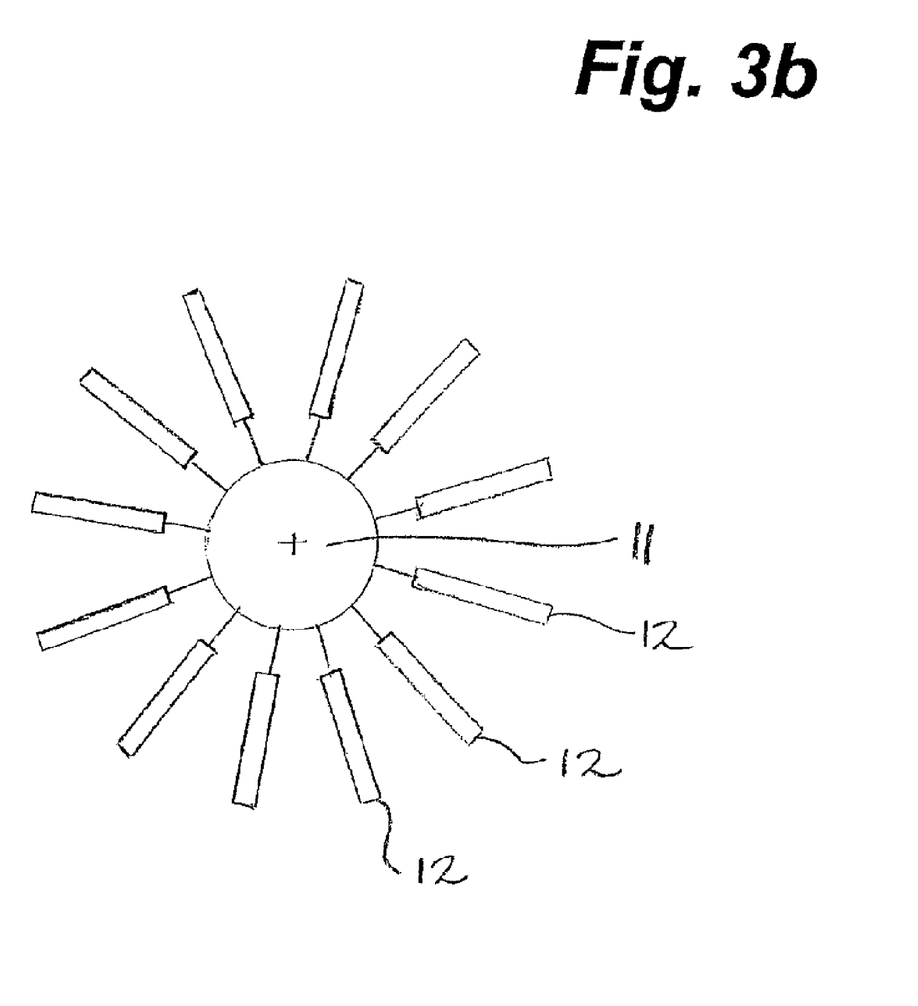
FIG. 3b is an end view of the rotor according to FIG. 3a illustrating the rows of blades positioned circumferentially about the rotor shaft.
Figure 6B:
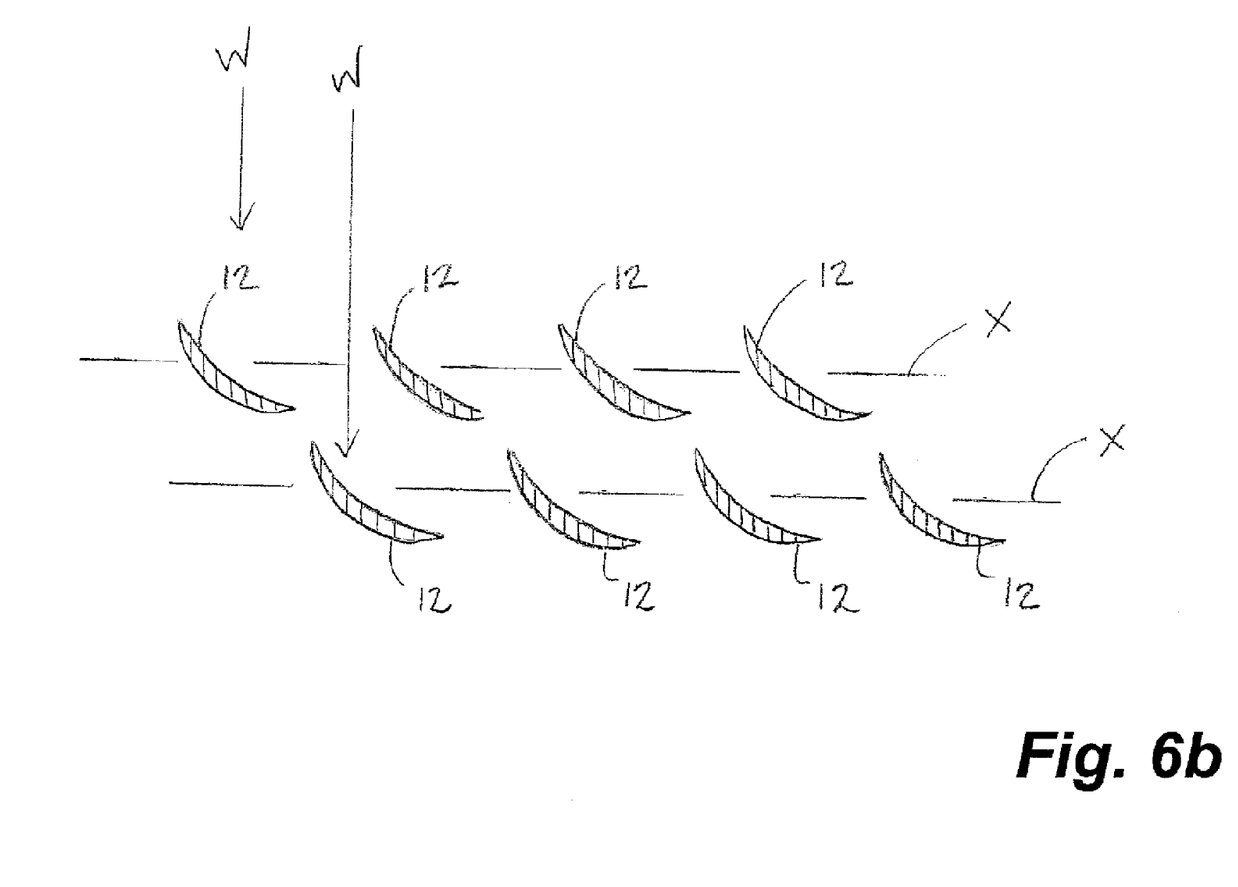
FIG. 6b is a schematic top view of two rows of blades, the blades in the second row being offset from the blades in the first row.
Figure 7:
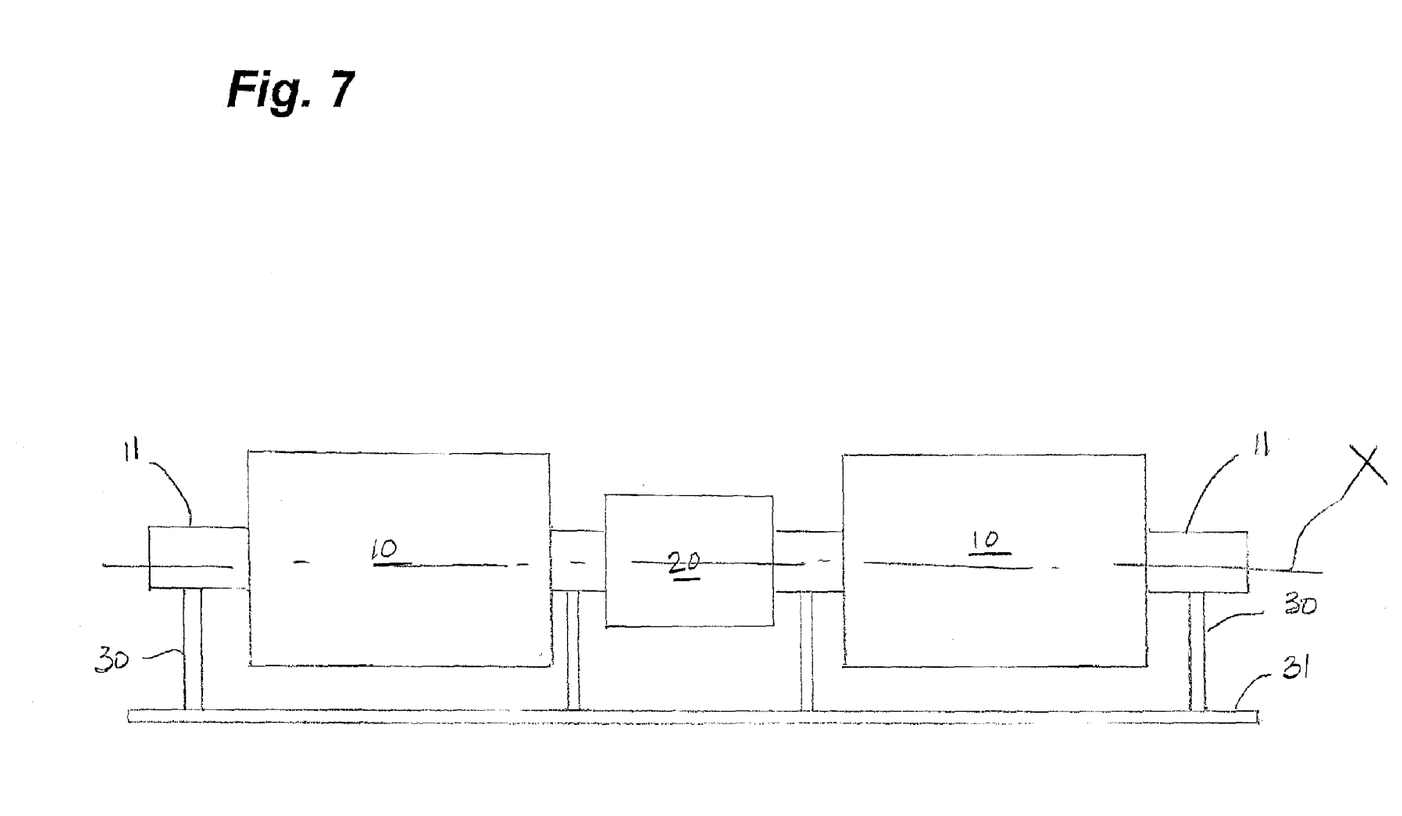
FIG. 7 is a schematic front view of an embodiment of the invention having two wind turbine rotors according to FIG. 3 mounted for rotation about a common horizontal axis and connected to a single generator and mounted on a frame, a support structure rotatable about a single vertical axis having been removed for clarity.

Having reference to FIGS. 3a and 3b, a fluid turbine 10 according to an embodiment of the present invention is shown. The turbine 10 comprises a horizontal shaft or rotor 11 having a blade system comprising a plurality of blades 12 mounted in rows 13 along a length and extending radially along a blade axis A and spaced about a circumference of the rotor 11. As shown in FIG. 6b, in one embodiment, the plurality of blades 12 in each successive row 13 may be positioned offset relative to the blades 12 in a preceding row 13 so as to position the plurality of blades 12 for maximizing engagement of the wind and efficiency of the generator 10.

Figure 4A:
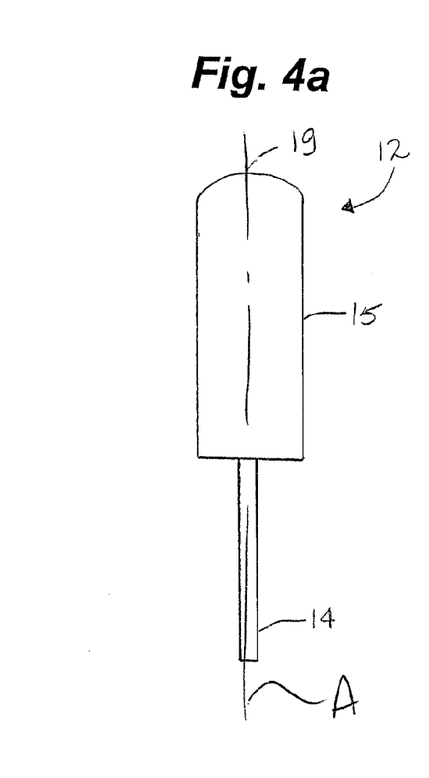
FIG. 4a is a plan view of an embodiment of the blade.
Figures 4B, 5, 6A:
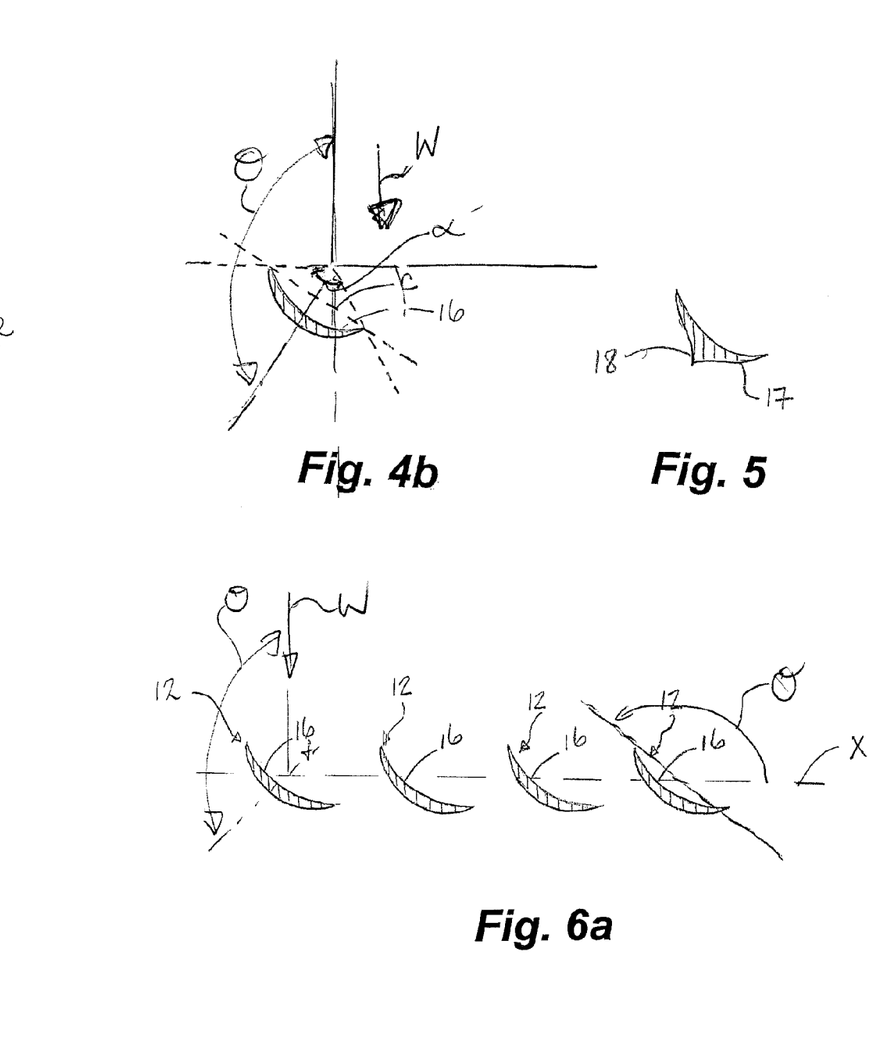
FIG. 4b is an end view of the blade according to FIG. 4a showing a curve in a paddle portion of the blade.
FIG. 5 is an end view of an embodiment of the blade illustrating an aerodynamic fin.
FIG. 6a is a schematic top view of a single row of blades according to FIGS. 4a and 4b illustrating a mounting angle relative to the horizontal rotor shaft.

Having reference to FIGS. 4a, 4b, 5, 6a, 6b and 10 and in a preferred embodiment, each blade 12 comprises a first end 14 for connection to the rotor 11 and a second free end 15 having an arcuate body or face 16 for engagement with the fluid W. Best seen in FIG. 4b, the arcuate face 16 is generally a circular section having a central angle $\alpha$ in a range from about 60 degrees to about 180 degrees and preferably about 120 degrees. As shown in FIG. 6a, each of the blades 12 is mounted to the rotor 11 so that a plane defined by a chord or secant C of the arcuate face 16 is rotated to an optimal angle of incidence or pitch angle $\sigma$, ranging from about 100 degrees to about 180 degrees and preferably about 120 degrees about vertical relative to a horizontal axis X defined by the rotor 11. The pitch angle $\sigma$ of the arcuate face 16 minimizes the disturbance in the direction of the fluid flow as it passes by the blades 12. The angle of rotation of the blades 12 about their axes A, A . . . may be adjusted upon installation of the blades 12 depending upon the location and prevailing conditions in the location in which the turbine 10 is to be used.

As shown in FIG. 5, in an alternate embodiment, a back side 17 of each blade 12 is formed having an aerodynamic fin 18 to further improve performance of the turbine 10. The fin 18 preferably extends the full length of the back side 17 of the free end 15 of the blade 12. Further, the fin 18 may protrude to a greater extent at a tip 19 of the free end 15 and taper to a narrower extent as it extends down the free end 15.

In a preferred embodiment as shown in FIGS. 7-10, the fluid turbine is a wind turbine 10. Preferably, two wind turbine units 10, as described above, are mounted along a common axis, being the horizontal axis X defined by the rotors 11, 11, and are operatively connected to a single load device such as a generator 20 positioned therebetween. Best seen in FIGS. 7 and 8, a structural frame 30 comprising a frame base 31 supports the rotatable turbine units 10 for mounting on a lower frame 32. The lower frame 32 is rotatable around a common shaft 4 as in the prior art and is mounted on wheels 5 for rotation of the entire wind turbine 10 about a circular track 6. The structural frame 30 is constructed to accommodate mounting of the weight of the generator 20 and the turbine units 10.

Figure 8:
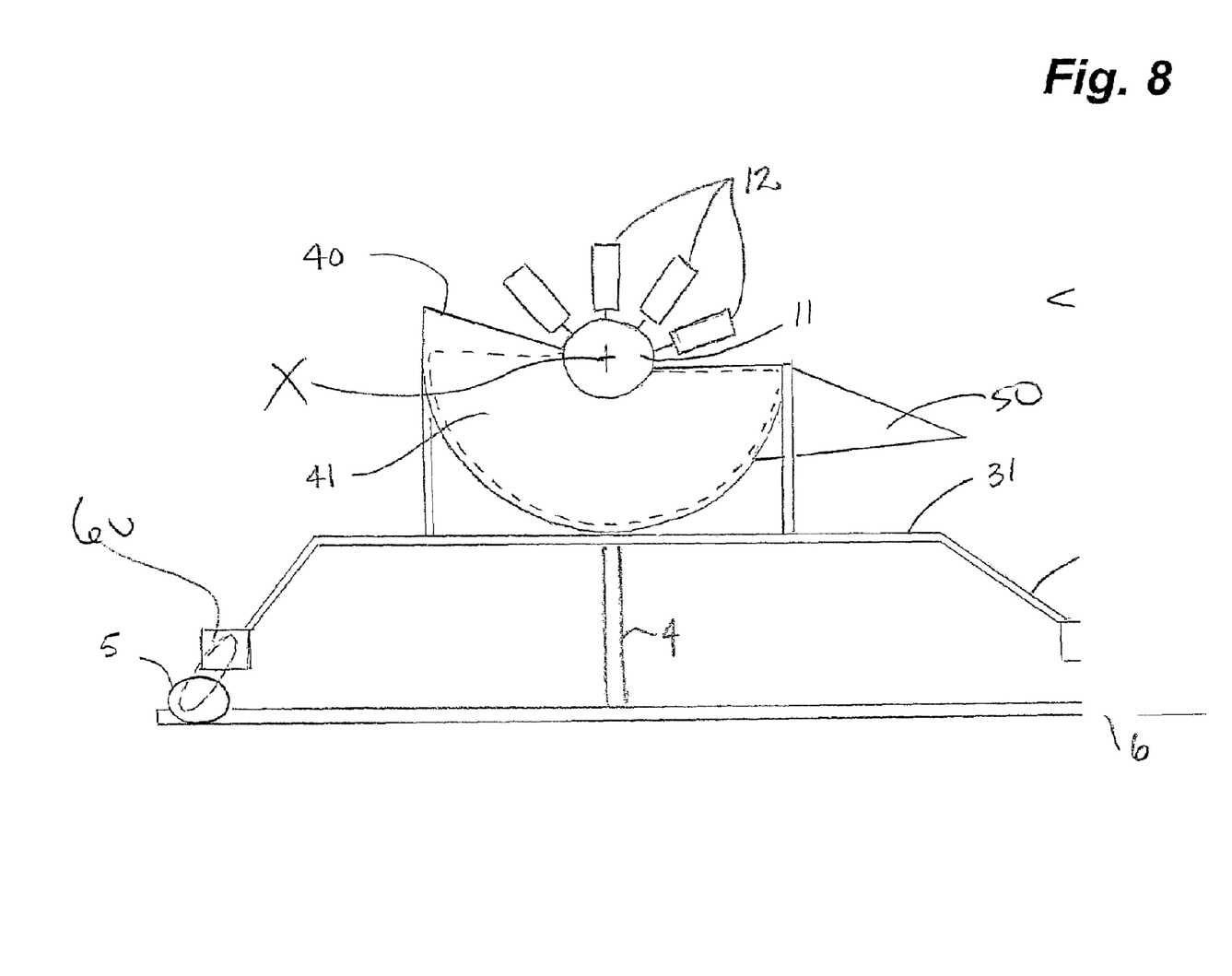
FIG. 8 is an end view according to FIGS. 3 and 6 and illustrating an inlet, an inner shroud; and a circular track.

As shown in FIG. 8 an outer, lower shroud 40 shields the second free end 15 of the lower blades 12 from the prevailing wind W during normal operation when rotating about the rotor 11 so as to avoid counteracting the upper exposed blades 12. Slots (not shown) may be added to the lower shroud 40 to permit water and debris to drain from the lower shroud 40. The lower shroud 40 is spaced above the base 31.

Further, in a preferred embodiment, an inner shroud 41 (shown in dotted lines) is rotationally mounted within the outer shroud 40. In the event the turbine 10 is shut down as a result of undesirable operating conditions, such as excessive winds, hail and the like, the inner shroud 41 is caused to rotate from an open position nested within the outer shroud 40 to a closed position covering the otherwise exposed blades 12 above the horizontal axis.

Preferably, opening and closing of the inner shroud 41 is controlled through a programmable logic controller (PLC) and wireless sensing units which respond to meteorological data provided thereto. In the case where a plurality of turbine units are situated in or near the same location, wireless sensors adjacent the general location may communicate meteorological data to the PLC's or data can be communicated remotely from weather stations to optimize operation of the unit or to close the inner shroud 41 and shut down the turbine units 10. In the case where the turbine unit 10 sustains damage which affects performance, the PLC is programmed to sense the alteration in performance and shut the turbine unit 10 down. By monitoring status of the unit during start up and during running the PLC can perform an emergency shutdown and place the unit in a fail safe mode when required.

Preferably, a shrouded inlet vane 50 is provided to assist in directing the flow of fluid tangentially past the upper exposed turbine blades 12. The angle through the inlet vane 50 can be adjusted by the PLC to match changes in the flow of fluid using conventional technology.

Figure 9:
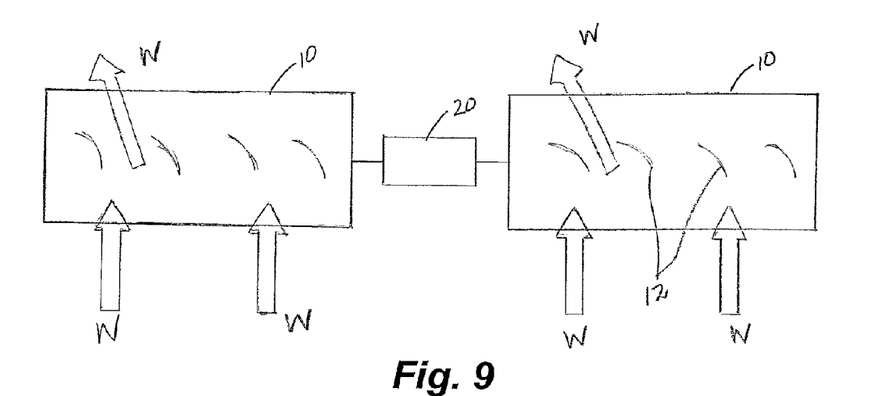
FIG. 9 is a schematic plan view of a wind turbine according to FIG. 7 at start up or shut down.
Figure 10:
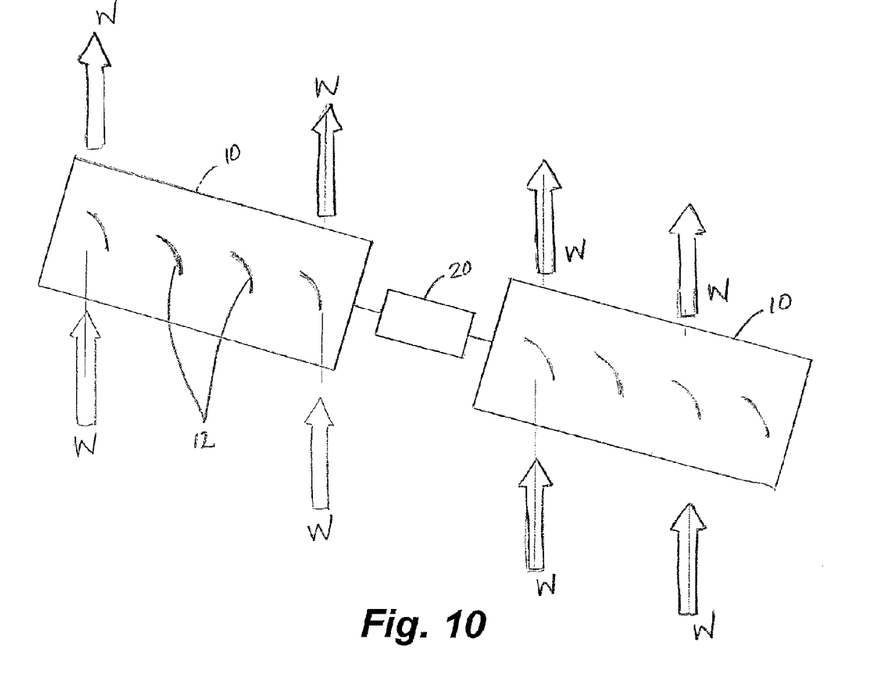
FIG. 10 is a schematic plan view of a wind turbine according to FIG. 7 during a normal operation, the wind turbine being rotated relative to the direction of wind flow to optimize contact of the wind with the blades.

In operation, electric motors 60, located at each wheel 5 drive the turbine unit 10 about the circular track 6. As shown in FIG. 9, at start up, shutdown and during extreme wind conditions the turbine unit 10 will be repositioned to an offset angle relative to the fluid flow to reduce the angle at which the fluid W contacts the arcuate blade face 16. As shown in FIG. 10, as the turbine unit 10 becomes operational it will be permitted to rotate in yaw or it will be locked into position by the PLC based on programs written for the PLC to be used under different environmental conditions and in different locations.

Preferably, the wheels 5 are further provided with brakes (not shown) which are used to lock the position of the turbine unit relative to the fluid flow.

What is claimed is:

1. A fluid turbine comprising:
   a support framework;
   a load unit;
   one or more rotors mounted for rotation about a horizontal axis and operatively connected to the load unit;
   a plurality of blades supported in a plurality of rows along a length of each of the one or more rotors, each blade of the plurality of blades having a blade axis extending radially therefrom and formed having a first attachment end for connection to the rotor and a second end having an arcuate face, a plane of a chord of the arcuate face being rotated about the blade axis at an angle relative to the rotor axis, each row of the plurality of rows being spaced about a circumference of the rotor;
   a lower shroud supported in the framework for shielding at least the second end of the plurality of blades when the blades are rotated therein and having an open top for exposing at least the second end of the plurality of blades into contact with wind when the blades are rotated thereto; and an inner shroud nested within the lower shroud in an open position wherein the blades are exposed to the fluid for contact therewith and rotatable therein to cover the open top of the lower shroud in a closed, failsafe position.

2. The fluid turbine of claim 1 wherein each of the one or more rotors is mounted for rotation about a horizontal axis.

3. The fluid turbine of claim 2 wherein the plane of the chord of the blade is rotated from about 100 degrees to about 180 degrees about the blade axis relative to the horizontal axis.

4. The fluid turbine of claim 2 wherein the plane of the chord of the blade is rotated about 120 degrees about the blade axis relative to the horizontal axis.

5. The fluid turbine of claim 1 wherein a central angle defined by the arcuate face is from about 60 degrees to about 180 degrees.

6. The fluid turbine of claim 1 wherein the central angle defined by the arcuate face is about 120 degrees.

7. The fluid turbine of claim 1 wherein the blades of each successive row of blades about the rotor are mounted offset to the blades of a previous row of blades so as to maximize fluid contact.

8. The fluid turbine of claim 1 wherein the fluid turbine is a wind turbine.

9. The fluid turbine of claim 1 wherein the second end of each blade further comprises an aerodynamic fin formed on a back side.

10. The fluid turbine of claim 1 further comprising:
a central shaft; and
a base for supporting the support framework, the base being rotationally connected to the central shaft for permitting the fluid turbine to be rotatable thereabout.

11. The fluid turbine of claim 10 further comprising:
a plurality of wheels supporting the base: and
a circular track for engaging the wheels, the fluid turbine being rotatable therein.

12. The fluid turbine of claim 10 wherein the lower shroud is spaced above the base.

13. The fluid turbine of claim 1 wherein the inner shroud is rotatably controlled between the open and closed position by at least one sensor.

14. The fluid turbine of claim 1 wherein the one or more rotors comprises two rotors operatively connected on opposing sides of the load unit along the rotor axis.

15. The fluid turbine of claim 1 wherein the second end of each blade further comprises an aerodynamic fin.

* * * * *